April 26, 1966 S. J. JAMISON 3,247,872

DIAPER

Filed April 17, 1964 5 Sheets-Sheet 1

INVENTOR.
SAMUEL J. JAMISON
BY John W. Tregoning
ATTORNEY

April 26, 1966 S. J. JAMISON 3,247,872

DIAPER

Filed April 17, 1964 5 Sheets-Sheet 2

INVENTOR.
SAMUEL J. JAMISON
BY John W. Tregoning
ATTORNEY

DIAPER

Filed April 17, 1964 5 Sheets-Sheet 3

INVENTORS:
SAMUEL J. JAMISON
BY John H. Tregoning
ATTORNEY

April 26, 1966 S. J. JAMISON 3,247,872

DIAPER

Filed April 17, 1964 5 Sheets-Sheet 4

INVENTOR.
SAMUEL J. JAMISON
BY John H. Tregoning
ATTORNEY

INVENTOR.
SAMUEL J. JAMISON
BY John H. Tregoning
ATTORNEY

United States Patent Office 3,247,872
Patented Apr. 26, 1966

3,247,872
DIAPER

Samuel James Jamison, East Brunswick, N.J., assignor to Johnson & Johnson, a corporation of New Jersey
Filed Apr. 17, 1964, Ser. No. 360,503
15 Claims. (Cl. 139—384)

This is a continuation-in-part of application Serial No. 288,067, filed May 14, 1963, which in turn is a continuation-in-part of application Serial No. 132,935, filed August 21, 1961.

The present invention relates to a woven textile fabric having different shrink characteristics in different zones. More particularly, it relates to a woven diaper fabric having different shrink characteristics in zones so disposed as to cause the diaper to become form-fitting when washed.

For many years the diaper industry has been providing form-fitting diapers by cutting out portions of the diaper blank or otherwise constructing a diaper such that areas conforming generally to the contour of babies' legs will be provided. This has proved to be a costly operation since the additional steps of cutting out the material from the blank and sewing the edges of the cutout area to prevent raveling has been necessitated.

The present invention provides a gauze diaper blank having at least one zone adapted to shrink on washing to provide a shaped diaper. The zone which provides the shrinking is characterized by possessing high twist yarns as compared to the rest of the diaper which contains all normal twist yarns.

Preferably, the instant invention provides a gauze diaper blank having at least one activating zone adapted to shrink on washing to provide a shaped diaper, said diaper having from about 25% to about 60% of the yarns of one set provided with a high twist multiplier of from about 5 to about 8 with the remaining yarns of the diaper having normal twist, provided that there is at least a 1.5 twist multiplier difference between said high and said normal twist yarns, said activating zones being characterized by containing all of said high twist yarn.

By the term "shaped diaper" as used herein is meant a diaper which conforms, after shrinkage, to a preconceived diaper configuration usually taking the planned form of either an hourglass shape or a T-shape depending on the placement of the activating zone. The diaper blank contains yarns of two sets, i.e. the warp set and the fill set, and from about 25% to about 60% of the yarns of one of these two sets possess a twist multiplier of from about 5 to about 8 and are all located in, and characterize, the activating zone, or zones, of the diaper which extend from one of two opposite edges of the rectangular blank to the other while paralleling the remaining two opposite edges. The remaining yarns of both sets of yarns both in the activating zone and in the remainder of the diaper are of normal or standard twist.

All of the yarn of one set of yarn in the activating zone may have a high twist multiplier; however, it is equally as possible that only a portion of the total yarn of that set in the diaper are of high twist while the remainder of that set in the activating zone are of normal or standard twist. All of the yarn in either set outside of the activating zone as well as the yarn of the remaining set in the activating zone will be of standard or normal twist since directional shrinkage is desired and corrugation is not desired. Should there be a plurality of activating zones in the diaper blank, each may or may not contain a substantially equal amount of high twist yarn, but in no event will the total high twist yarn of the two or more zones be less than about 25% nor more than about 60% of the total of that set of yarns in the diaper blank.

The normal twist yarns do shrink to a measurable degree in washing; however the shrinkage factor for the high twist yarn in the activating zone is much greater than that of the standard twist yarn so that the shrinkage exhibited by the activating zone after the washing and drying of the diaper is sufficiently greater than that of the rest of the diaper to provide the desired configuration. Also since the yarn of only one set in the activating zone contains high twist, the shrinkage in the activating zone will be largely directional because it will develop along the yarn of one set, or in other words, in the direction of the yarn of that set. Therefore, there is a considerable and very noticeable lessening of the area, i.e. the activating area or zone, of the diaper blank in the direction corresponding to the direction of the length of the high twist yarns, i.e. in the fill or in the warp direction, which is the result of the shrinking induced by washing. A shaped diaper results and the shape is controlled by the positioning of the activating zone.

It is essential that the twist multiplier of the high twist yarns be of from about 5 to about 8, with 6 to 7 being preferred since yarn having a twist multiplier below 5 will not effect the desired shrinkage because there is insufficient energy potential contained in such yarns, and yarns having a twist multiplier above 8 become economically impractical and tend to become abrasive. In any instance it is equally essential that there be a twist multiplier difference of at least 1.5 between the twist multiplier of the high twist yarn and that of the normal twist yarn. A difference of less than 1.5 will not produce a sufficient twist differential to effect the extent of shrinking difference between the high twist and normal twist yarns to result in the formation of a shaped diaper. In this connection it is very important that the non-shrink zones or non-activating zones contain essentially all normal twist yarns.

It is desired that the diaper blank shrink a total of at least about two inches, but preferably three inches, in the direction of the high twist yarn in the activating zone or at least about one inch on a side as compared to the length or width of the remainder of the diaper in the same direction. Less than this amount of shrinking difference will not produce a diaper with a functionally improved shape from that of the normal rectangular shape.

Diaper fabric is usually low count woven fabric, termed gauze diaper fabric, having a woven construction of warp and fill yarns wherein the warp yarns extend substantially parallel to the length of the fabric and the fill yarns extend in the widthwise direction of the fabric which is more usually produced in continuous length of specified widths woven in such a manner as to be joined along the longitudinal edges in common selvages. This fabric may be single-ply or multi-ply and may consist of a plurality of plies intermittently interwoven to form an essentially double-ply single layer fabric or secured along lines running in predetermined directions according to preconceived patterns.

From this diaper fabric, diaper blanks are taken or cut. The diaper blank is usually rectangular having two longitudinal and two lateral edges or sides and forms the sum total of the cloth of the diaper. The diaper blank is, of course, of the same basic woven construction as the diaper fabric and contains warp and fill yarns. The warp and fill yarns and the warp and fill direction of the diaper blank are defined with reference to the diaper fabric; therefore, the warp yarns or warp direction of the diaper blank need not be the length of the blank but will always define the lengthwise direction of the original diaper fabric, while in the blank it may, depending on how the blank was taken from the diaper fabric, be either the lengthwise or widthwise direction of the diaper blank. The size of the blank may vary from about the normal 40 x 20 inch size to smaller or larger sizes depending on the desired form and whether or not the blank was meant to be folded. The fabric may have a single layer or multi-layer construction with a plain, twill, sateen, birds-eye, etc. weave all of which are familiar to those skilled in the art.

A multi-layered diaper fabric usually has a thread count in each layer ranging from 32 to 48 ends per inch in the warp direction and from about 28 to 44 picks per inch in the fill direction, or in the weft, with yarn sizes ranging from 20's to 35's in the warp and from 25's to 45's in the fill. In the normal case these yarns do not have a twist multiplier of greater than 4.75. These yarns are spoken of as having a standard twist multiplier.

A single layered diaper fabric customarily has a thread count ranging from 48 to 80 ends per inch in the warp direction and from about 24 to 56 picks per inch in the fill direction. The yarn sizes range from 8's to 30's in the fill and from 25's to 35's in the warp. In the normal case these yarns are provided with a standard twist multiplier.

While there is no hard and fast rule regarding twist multipliers, several are used by the trade. In the case of one inch cotton a twist multiplier of 3.50 in the fill direction and 4.75 in the warp direction is considered normal or standard twist. Such limits may vary to a degree with different fibers or yarns; however, the customary rule is that the coarser the fiber or yarn the less twist and the finer the more twist to accomplish similar results.

The twist multiplier for a yarn is determined by dividing the number of turns per inch by the square root of the yarn size. In prior art woven diapers, the individual yarns in the warp set and in the fill set respectively have substantially the same number of turns per inch with the twist multiplier for the warp yarns generally not in excess of 4.75 and the twist multiplier for the filling yarns generally not in excess of about 3.75. This twist multiplier limitation applies with regard to one inch cotton, however, it would vary only to a minor amount, if at all, with other cellulosic fibers, e.g. rayon, and would also increase as the yarn became finer, or decrease as the yarn became coarser. Thus the degree of shrink could be modified by the use of coarser or finer yarns in part or in total. In such a case the twist multiplier could remain constant or could be changed if desired which would nullify, reduce or increase the effect of the use of finer or coarser yarn depending on what was accomplished with regard to the twist multiplier.

The area of the diaper blank or the activating zone which is to shrink to form the shaped diaper of the present invention should cover from about 25% to about 50% of the total area of the diaper and preferably should be between about 30% to about 40% of the total diaper area. A shrink zone of less than 25% of the total area of the diaper blank results in a zone which is in reality ineffectual since it covers too small an area of the diaper. A shrink zone of in excess of 50% of the total area of the diaper is too great in that too little of the diaper remains that is of sufficient length or width to extend around the girth of the infant, i.e. an effectually contoured diaper is not provided.

The twist in the normal, or standard, yarn may be placed in either the right-hand direction (Z twist), the left-hand direction (S twist), or it may be that the yarn may have a combination of S and Z twist yarns in a set. When the high twist yarns are the fill yarns, the twist may be S or Z, or S and Z randomized or alternating. If the warp yarns are the high twist yarns, the direction of twist must be other than a combination of S and Z, since with this combination undesired corrugation results.

If the filling set of yarn in the activating zone contains all of the high twist yarn, it is preferred that these filling yarns all have the same direction of twist whereas if the warp set contains the high twist yarn it is preferred that the area to be shrunk contains yarn having the same direction of twist while the remaining areas contain standard yarn having different directions of twist randomized throughout the non-shrinking or non-activating areas. However, if very open construction is used in the zones of high shrinkage, the high twist yarns may be a combination of S and Z twist yarns, since the very open weave lessens the problem of corrugation in the high shrink zone.

In contemplating a shaped diaper, two shapes appear to be the most desirable and these are appropriately called the hourglass and the T-shaped (see FIGURES 5 and 20 respectively). This does not exclude other configurations but merely indicates the two most desirable forms. It will be appreciated that prefolded diapers as well as diapers which are to be folded into the reversible type diaper are included in the invention disclosed hereby.

The desired configuration is built into the diaper by providing zones which are characterized by containing all of the high twist yarns which are in the diaper blank. The direction of shrink is established by providing the high twist yarns in either the fill or the warp yarns which, of course, effects shrinkage in the fill direction, or the warp direction, respectively. The amount of resultant shrinkage will be effected by the twist multiplier difference between that of the high and normal twist yarns. The greater the twist multiplier difference the greater the degree of shrinkage and the larger the high twist multiplier of the high twist yarn, the greater the degree of shrinkage; provided, that the twist multiplier difference between the high and normal twist yarns also increases. The remaining set of yarns in the shrinking zone, i.e. those other than the fill or warp which are high twist, are of normal twist since directional shrinkage is the purpose of this invention.

The amount and type of shrinkage in the diaper blank is influenced by construction and the provision of zones of intermediate twist multiplier and therefore intermediate shrinkage characteristic. If the shrinking or activating zone, i.e. the zone containing the high twist yarn, is also constructed of a weave different than that of the rest of the diaper an increase in the amount of shrinking occurs. This increase is slight but noticeable; however, the insertion of an ordinary weave is not a substitute for the high twist yarn and would, by itself, effect insufficient shrinkage to allow the formation of the form-fitting or shaped diaper of this invention. In this connection any combination of two weaves can be used in the diaper blank.

Zones of lesser width but running the length of the high shrink zone may be constructed on, and adjacent to, either side of the activating zone or zones, and the providing of one such intermediate zone on either side of the activating zone is termed the providing of a pair of intermediate zones. Equally desirable effects are accomplished by providing two pairs of intermediate zones: two on either side of the high twist zone. The intermediate zones possess yarns of twist intermediate between that of the high twist and the normal twist yarn; however, the twist multiplier differential between the high twist yarns of this zone, or the zones, need not be at least 1.5. A twist multiplier difference of half of the twist multiplier difference between the high twist and standard yarn would be preferred to effect the desired transitional shrinkage.

The preconceived diaper configuration is designed, in the usual case, to provide reduced width in the area of the crotch while maintaining sufficient diaper width in at least one end of the diaper blank to insure that the diaper will cover the area of the buttocks and that it will be of sufficient width to permit it to fit around the girth of the infant and thus be pinned or otherwise secured at its corners or ends. Additionally, the shrink or activating zone, after shrinking, possesses elasticity and readily conforms to the crotch area contour of the wearer. Thus the size of the wearers' legs or, for example, the extent of protrusion of the stomach does not effect the improved conformability of the shaped diaper of this invention.

A diaper blank similar to that of U.S. 3,072,124 may also be constructed and an activating zone or zones may also be provided therein whereupon folding consistent with the teachings of that patent and development of the activating zone(s) will result in a form-fitting diaper consistent with this invention.

The invention has been described in connection with its preferred embodiments but many modifications thereof are included without a departure from the inventive concept, which is limited only by the scope of the appended claims.

Other features and advantages of the invention will be apparent from the following description taken together with the accompanying drawings wherein.

Figure 1:
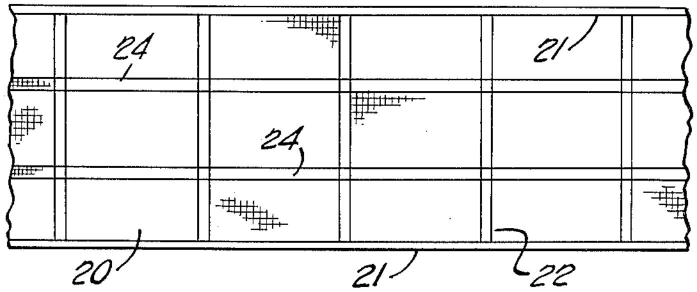
FIGURE 1 is a schematic plan view of a portion of a strip of woven diaper fabric.

Referring to FIG. 1 of the drawings there is shown a fabric 20 woven in a continuous sheet approximately forty (40) inches wide. The fabric is a two-ply gauze diaper cloth with a selvage 21 at each lateral edge and with transverse pinking bars 22 evenly spaced along the length of the fabric approximately twenty (20) inches apart. Pinking bars 22 are strips of fabric woven as a single-ply to produce a tighter weave and minimize unraveling when the fabric is cut along the bars to form diaper blanks 23 (FIGS. 2A–2D). The warp yarns run the length of the fabric while the fill yarns run its width or parallel to pinking bars.

Figures 2A, 2B, 2C, 2D, 3, 4:
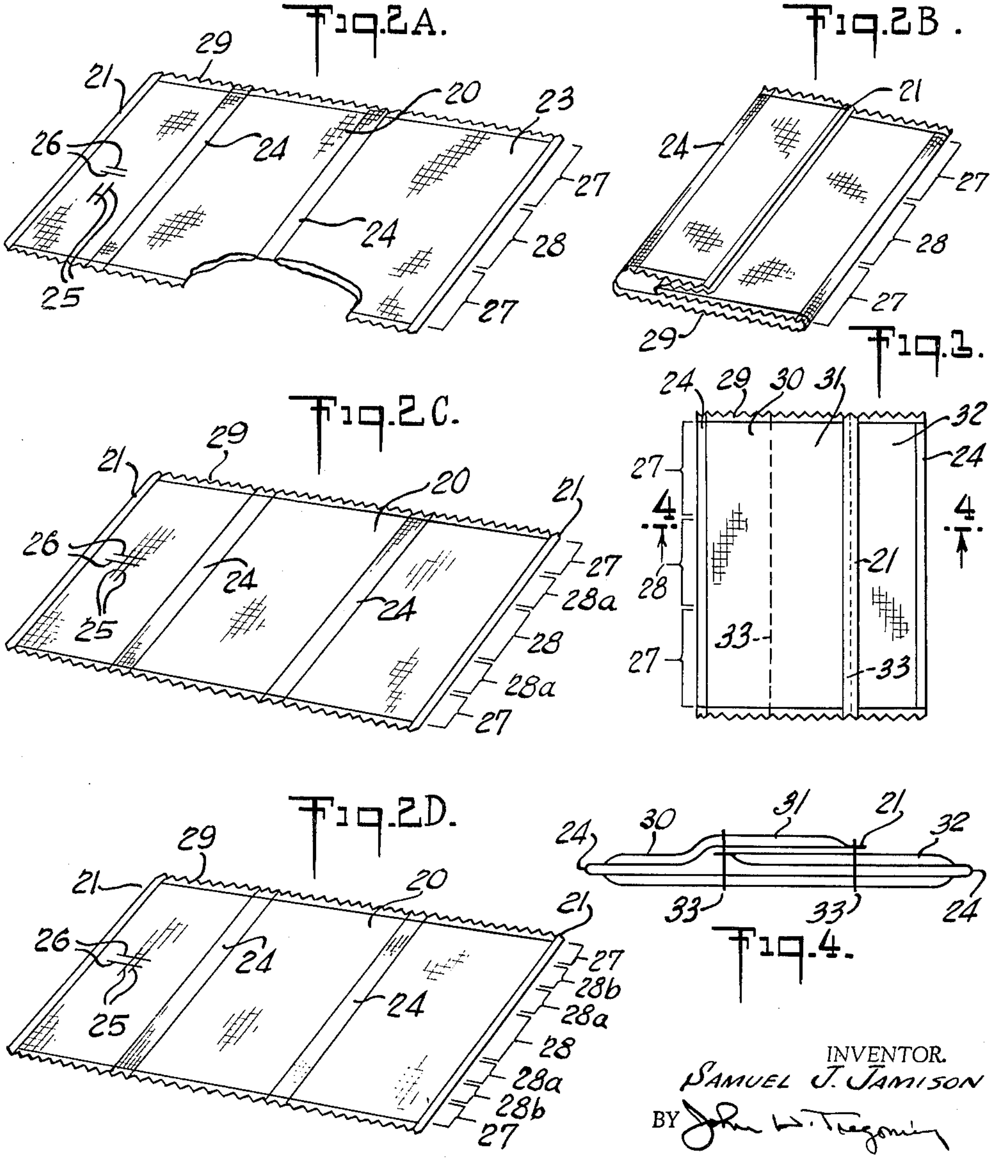
FIGS. 2A through 2D are schematic plan views of diaper blanks which represent embodiments of the instant invention which can be taken from the woven diaper material of FIG. 1, dependent on the particular construction of the diaper fabric.
FIG. 3 is a plan view illustrating the diaper blank of FIG. 2A folded and sewn to form a woven rectangular diaper.
FIG. 4 is a sectional view along line 4—4 of FIG. 3.

Intermediate and parallel to the selvage edges are a pair of spaced wearing strips 24 woven integral with the two-ply diaper cloth. The wearing strips are located so as to present convenient lines of fold for a prefolded diaper (FIG. 3). In a diaper thus prefolded, the wearing strips are located along the folded edges and will because of their tighter weave possess greater abrasion resistance during use. As to the forming of the prefolded diaper and with reference to FIGS. 2A and 2B, the two opposing lateral edges each having selvage edge 21 are folded along the nearest wearing strip 24 and over the surface of diaper blank 20 in parallel relation, to form opposed marginal panels of unequal length with a separating section of the sheet between the marginal panels, the sheet may then be folded to superimpose the marginal panels and the lateral edges of the sheet whereby a four-layer panel section is formed and secured in position as is shown in FIG. 2B and as is taught by U.S. 2,600,634.

In the embodiment of the invention illustrated in FIGS. 2A, 3 to 6, the diaper blank is rectangular and presents opposed selvage edges 21 along its smaller dimension and opposed pinked edges 29 along its larger dimension. Its warp yarns 25 have substantially the same number of turns per inch through the whole of the diaper. Its filling yarns 26 in a pair of zones 27 disposed parallel to and adjacent the pinked edges of the diaper blank have substantially the same number of turns per inch while in another zone 28 intermediate and parallel to the zones 27 the filling yarns have at least one and one-half (1½) times as many turns per inch as have the filling yarns in the zones 27.

The diaper blank 23 is folded along each of the wearing strips 24 and inwardly from the selvage edges 21. The position of the folds inwardly from the selvage edges is such that the marginal portions of the blank adjacent the selvage overlap and the wearing strips 24 become the folded edges of the diaper. The folded diaper of FIGS. 3 to 6 consist of panels 30, 31, and 32 of approximately equal width, wherein the center panel 31 comprises three thicknesses of two-ply guaze diaper cloth and the lateral panels 30 and 32 two thicknesses each. The panels of the folded diaper are held in their relative positions by sewing along the selvage edges. It is to be appreciated that the provision of the wearing strips 24 is optional since they may not be desired and since the diaper blank may be of smaller dimensions whereby folding may not be desired. This is also applicable to the diaper blanks of FIGS. 2A–2D.

Figure 5:
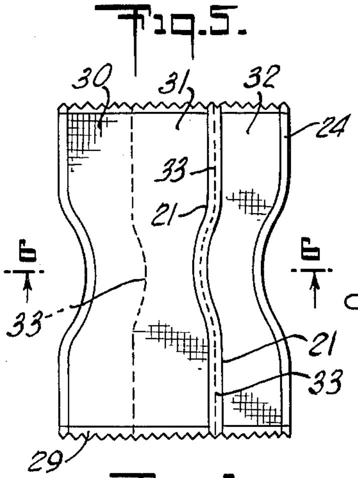
FIG. 5 is a plan view of the folded diaper of FIG. 3 after it has been washed and differentially shrunk to produce a form-fitting diaper in accordance with the invention.
Figure 6:
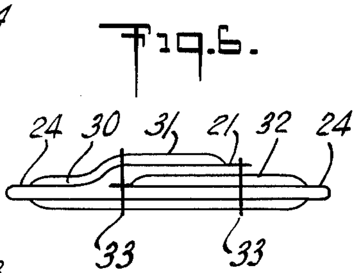
FIG. 6 is a sectional view along line 6—6 of FIG. 5.

The prefolded diapers just described will, upon washing and drying, shrink to a greater degree in zone 28 containing the filling yarns having the higher twist per inch than in the zones 27 whose filling yarns have a lower twist per inch. Specifically, in the diaper of FIG. 3 which has the yarns with higher twist in a center zone 28, shrinkage occurs to give a form-fitting or hourglass shape (FIG. 5).

Figure 7:
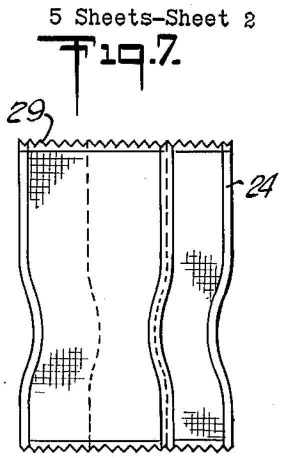
FIG. 7 is a plan view of a diaper blank incorporating a different embodiment of the present invention and in which the shrink zone is located in a different position.

FIGS. 2C and 2D represent embodiments which can be taken from a fabric like that shown in FIG. 1 dependent, of course, upon its construction. Zone 28 is the zone of high twist yarn and zone 27 is the zone of normal twist yarn, however, interposed between and parallel to these zones are a pair of intermediate zones or zones 28A termed a set. These zones have a twist multiplier less than that of zone 28 yet greater than that of zone 27. FIG. 2D depicts yet the addition of another set of intermediate zones, i.e. 28B which possesses a high twist multiplier less than zone 28A and greater than zone 27. On washing and drying the diaper blank shrinks greatest in zone 28 which represents the zone having the highest or greatest twist multiplier while shrinking of diminished scope is represented by the set of zones 28A and set 28B. The set of zones represented by 28B exhibit the least amount of shrinkage as compared to the set of zones 28A and zone 28. Zones 27 possess all normal twist yarn and exhibit nominal shrinking. Of course, zones 28, 28A, 28B and 27 may all be of different weave; for example, in FIG. 2C high twist zone 28 may be woven with a low yarn count and a loose weave while the set of zones 28A might be 100% tubular plain weave and the zones 27 100% single layer fabric. They may also differ in construction as well, i.e. they may or may not be of multi-ply construction. In FIG. 2D, zones 27 and 28 might be woven as in FIG. 2C while the set of zones 28A might be 100% tubular plain construction and the set of zones 28B might be 100% double cloth. By locating the zones containing the yarns of higher twist slightly off-center in the diaper blank, a diaper with the form-fitting section correspondingly located may be obtained upon folding and subsequent washing (FIG. 7).

In FIGS. 8–12 there is shown a different embodiment of a diaper according to this invention.

Figure 8:
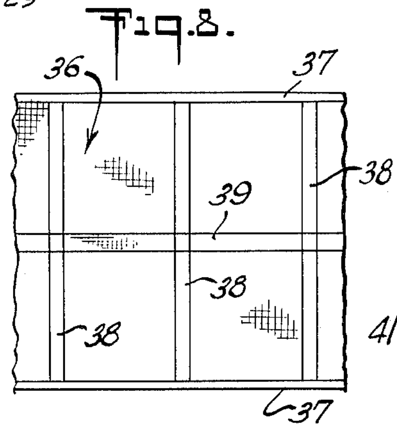
FIG. 8 is another schematic plan view of a portion of a strip of woven diaper fabric.

According to this embodiment, there is shown in FIG. 8 a fabric 36 woven in a continuous sheet form—approximately forty (40) inches wide. The fabric is multi-layer gauze diaper cloth with selvage 37 at each lateral edge and with transverse pinking bars 38 evenly spaced along the length of the fabric approximately fourteen (14) inches apart.

Parallel to the selvages and midway between them is a wearing strip 39 woven integral with the multi-layer diaper cloth.

Figure 9A:
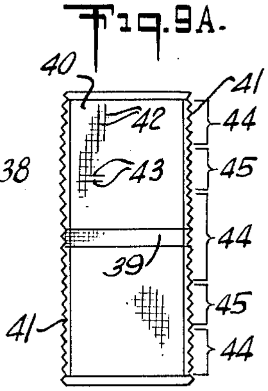
FIGS. 9A and 9B are schematic plan views of diaper blanks which, dependent on the construction of the diaper fabric, could be cut from the fabric of FIG. 8.
Figure 9B:
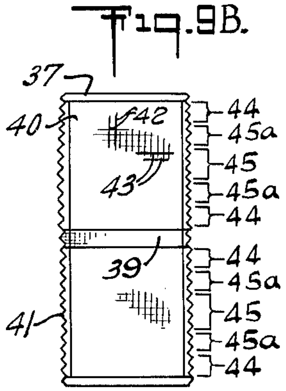

Diaper blanks 40 in FIGS. 9A and 9B are formed by cutting along the pinking bars 38 (FIG. 8).

Each diaper blank 40 presents opposed selvage edges 37 along its smaller dimension and opposed pinked edges 41 along its larger dimension. Its filling yarns 42 have substantially the same number of turns per inch throughout the whole of the diaper blank. It warp yarns 43 in a plurality of different zones 44 parallel to and adjacent each side of the wearing strip 39 have substantially the each side of the wearing strip 3 9have substantially the same number of turns per inch while the warp yarns in a plurality of different zones 45, parallel to and located one on each side of the wearing strip between the zones 44, have at least 1½ times as many turns per inch as have the warp yarns in zones 44.

The diaper blank depicted in FIG. 9A is taken from a diaper fabric corresponding to that of FIG. 8 wherein in each of the two panels one zone of high twist yarns is woven into the fabric. However, with reference to FIG. 9B, an intermediate set of zones can be interposed between the zone containing the high twist yarns 45 and the zones 44 containing the normal twist yarns for the same purpose as was described with reference to FIGS. 2C and 2D. There may be one set or two sets of intermediate zones; however, the yarn contained in these zones of intermediate twist and the constructions of all zones may differ.

Figure 10:
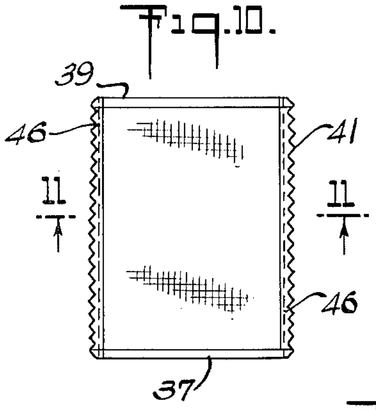
FIG. 10 is a plan view illustrating the diaper blank of FIG. 9A, folded and sewn to form a woven rectangular diaper.

The diaper blank 9A is folded along the wearing strip 39 to superimpose the selvages 37 and the zones 45 containing the high twist yarns. The folded blank is stitched along the pinked edges to prevent the diaper from unfolding during subsequent use (FIG. 10). The diaper blanks of FIG. 9A and FIG. 9B are of the type termed "reversible" since while they are normally folded along wearing strip 39 to superimpose the diaper panels extending in opposed directions from the wearing strip. The folded diaper blank is often secured in this position by sewing. The fold can be reversed, after some wear, by refolding the two panels in the opposite direction to cause the faces of each panel that were exposed in the previous folded position, to be positioned in face-to-face contact while causing the previously unexposed panels to form the exposed face portions of the diaper. Thus the life of the diaper blank is greatly increased.

Figure 12:
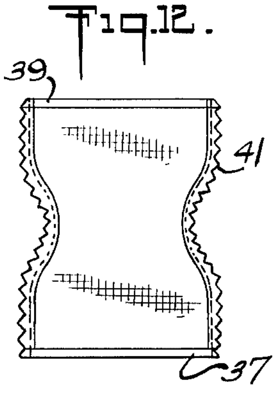
FIG. 12 is a plan view of the folded diaper of FIG. 10 after it has been washed and differentially shrunk to produce a form-fitting diaper in accordance with the invention.
Figure 11:
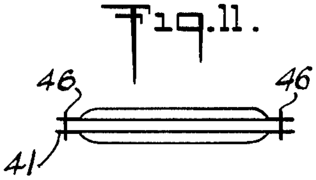
FIG. 11 is a sectional view along line 11—11 of FIG. 10.

The prefolded diaper just described will, upon washing and drying, shrink to a greater extent in the zones containing the yarns having the higher twist, than in the remaining zones, to produce a form-fitting or hourglass-shaped diaper (FIG. 12).

If desired all of the yarns of one set of yarn in the activating zone may have a high twist. A diaper produced from such a fabric is shown in FIGS. 13 through 18.

Figure 13:
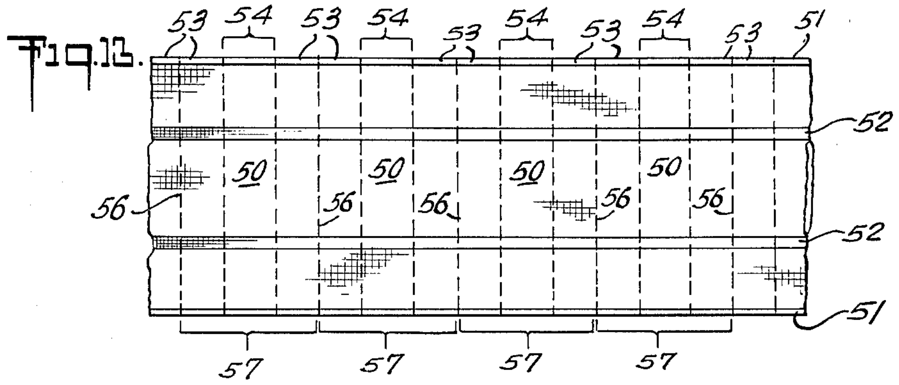
FIG. 13 is a schematic plan view of a portion of a strip of woven diaper material incorporating another embodiment of the present invention.
Figure 15:
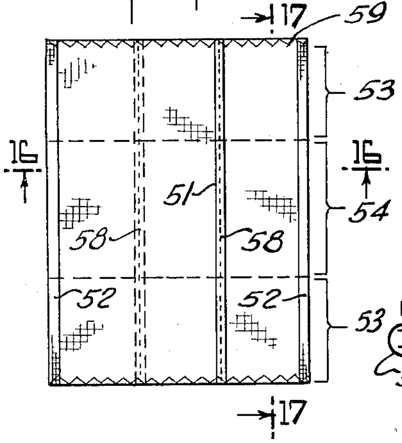
FIG. 15 is a plan view illustrating the diaper blank of FIG. 14 folded and sewn to form a woven rectangular diaper.
Figure 16:
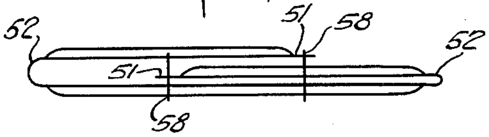
FIG. 16 is a sectional view along line 16—16 of FIG. 15.
Figure 17:
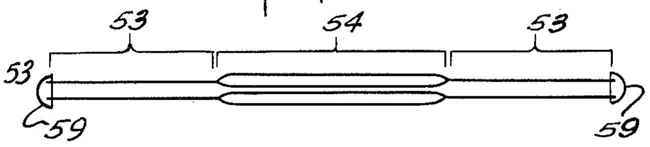
FIG. 17 is a sectional view along line 17—17 of FIG. 15.
Figure 18:
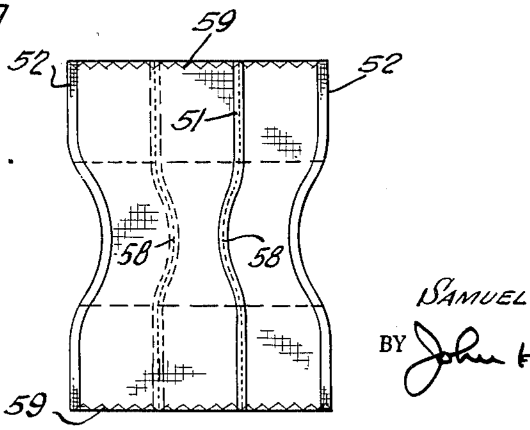
FIG. 18 is a plan view of the folded diaper of FIG. 15 after it has been washed and differentially shrunk to produce a form-fitting diaper in accordance with the invention.

Referring to FIG. 13 of the drawings there is shown a fabric 50 woven in a continuous sheet approximately forty (40) inches wide. The fabric has a selvage 51 at each lateral edge. Intermediate and parallel to the selvage edges are a pair of spaced wearing strips 52 woven integral with the diaper cloth. The wearing strips are located so as to present convenient lines of fold for the prefolded diaper (FIG. 15).

Although the fabric of FIG. 13 is woven with different weaves over zones 53 and 54 of the fabric, this is optional since it only serves to provide a slight increase in the degree of shrinkage in the activating zone. The significant shrinkage is still established by the locating of the high twist yarns in the activating zone 54. Zones 53 may be woven as a plain tubular weave or in a single layer twill or sateen weave while the zone 54 is woven as a tube using a 2 x 2 filling rib weave or a twill or sateen weave. If normal yarn sizes are used in weaving the fabric depicted, the zone 53 will contain from about 76 to 84 filling yarns per inch in a single layer or about 38 to 42 filling yarns per inch in each of two layers while the zone 54 will contain from about 29 to 33 filling yarns per inch in each layer.

Figure 14:
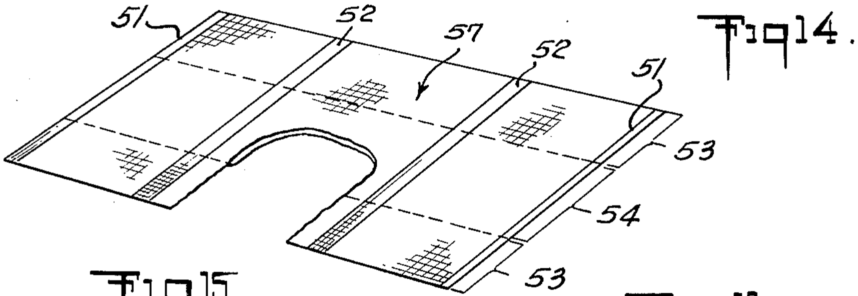
FIG. 14 is a schematic plan view of a portion constituting a diaper blank of the woven diaper material of FIG. 13.

Diaper blank 57 from the fabric of FIG. 13 is produced by cutting the fabric along a transverse center line 56 of zone 53. Such a blank is shown in FIG. 14. The diaper is folded and sewn 58 (see FIG. 15) as was previously described for FIG. 3, and the cut edges of the fabric overedged 59 (FIG. 15) to prevent raveling. The folded diaper upon washing and drying will shrink to a greater degree in zone 54 which is defined by containing all of the high twist yarns.

If desired, the zone of greater shrinkage may be located nearer one end of the diaper as shown in FIG. 7 rather than at the center. Such a shape desirably gives better coverage for the babies' buttocks and a lesser bulk and better fit at the front.

Whether to place the higher twist yarns in the warp set or the filling set will depend on the size of the woven fabric, and if or how it is to be folded. If the warp yarns run lengthwise of the finished diaper, the yarns of higher twist preferably should be in the filling set, whereas if the filling yarns run lengthwise of the finished diaper the high twist yarns preferably should be in the warp set.

In all cases the diaper, when washed and dried, will shrink more in the zone containing the higher twist yarns than in the remaining zones and hence will give a form-fitting shape dependent upon the difference in yarn twists used, the relative number of higher and lower twist yarns, the construction used and the relative location of the higher and the lower twist yarns in the body of the fabric.

Figure 19:
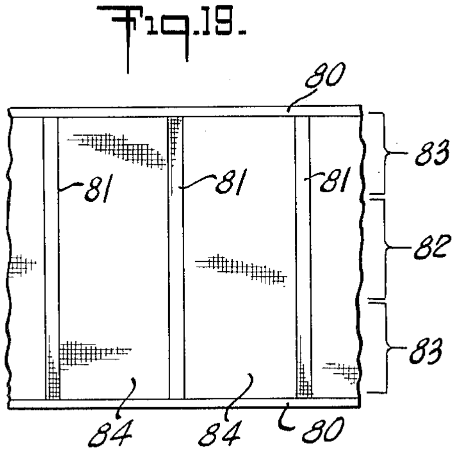
FIG. 19 is a schematic plan view of a portion of a strip of woven diaper material which can incorporate one of many other embodiments of the present invention.

FIG. 19 depicts a portion of a strip of woven diaper fabric having a zone of high twist yarn 82 woven therein. Zones of normal twist yarn are woven on either side and all zones extend the length of the diaper fabric or in the warp direction. Diaper blank 84 is cut from the diaper fabric by cutting along each of the pinking bars 81.

Figure 20A:
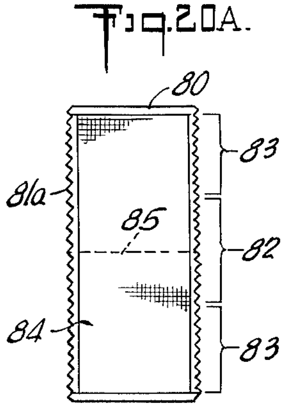
FIGS. 20A through 20D represent possible diaper blanks which can be taken from a diaper fabric like that of FIG. 19, depndent on its construction.

The diaper blank 84 has a center zone having one set of yarns which contain all of the high twist yarns in the blank. The set of high twist yarns is the warp set since shrinking is desired in the direction of the warp yarns or in the direction of the width of the diaper blank. The diaper of FIG. 20A is adapted to be folded over on itself along dotted line 85 to effect a reversible diaper blank of a T-shaped configuration which is shown in FIG. 20D. 81A represents the pinking edge of the diaper.

Figure 20B:
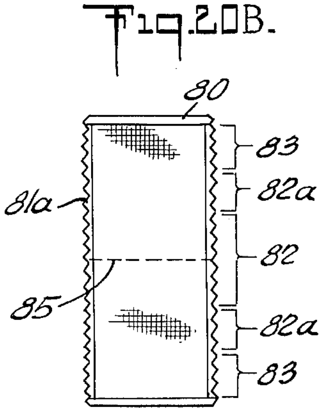
Figure 20C:
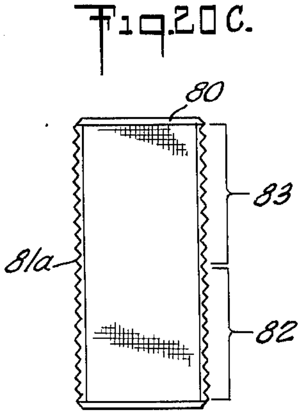
Figure 20D:
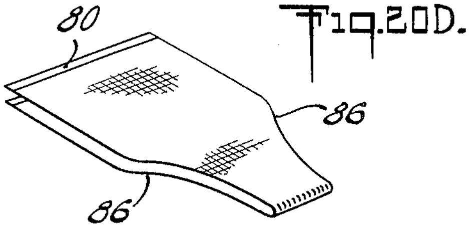

FIGS. 20B and 20C depict different embodiments of diaper blanks which could be taken from the diaper fabric of FIG. 19, dependent on the construction of the fabric. If the fabric had intermediate zones 82A, which represent two or a set of like zone, interposed between the zone 82 containing the high twist yarn and the zone containing all normal twist yarn 83 and if the set of zones 82A were of a high twist multiplier such as to effect shrinkage yet of a twist multiplier below that of the high twist yarns and above that of the normal twist yarn, a lesser degree of shrinking would occur in these zones 82A to effect a more transitional diminution in the width of the diaper. Once again the warp yarns are the high twist yarns, therefore, the yarn of the intermediate zone that have the intermediate twist multiplier must be the warp set. Folding along dotted line 85 will produce a diaper similar to that depicted in FIG. 20D but with less pronounced shoulder areas 86.

In FIG. 20C a two zone diaper blank is depicted, i.e. a high twist shrink zone and a normal twist non-shrink zone. It is understood that for such a blank, a like construction of zones in the diaper fabric of FIG. 19 must also exist with the yarns of high twist running the length of the diaper, or in the warp direction. Shrinking of the high shrink zone will produce a single layer T-shaped diaper.

Figure 21:
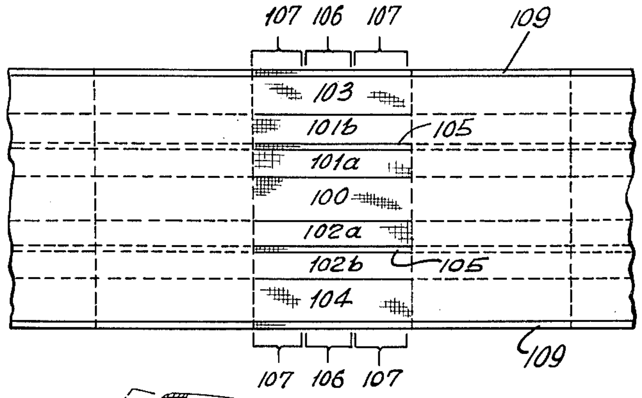
FIGS. 21 through 23 depict yet another embodiment of the instant invention.
Figure 22:
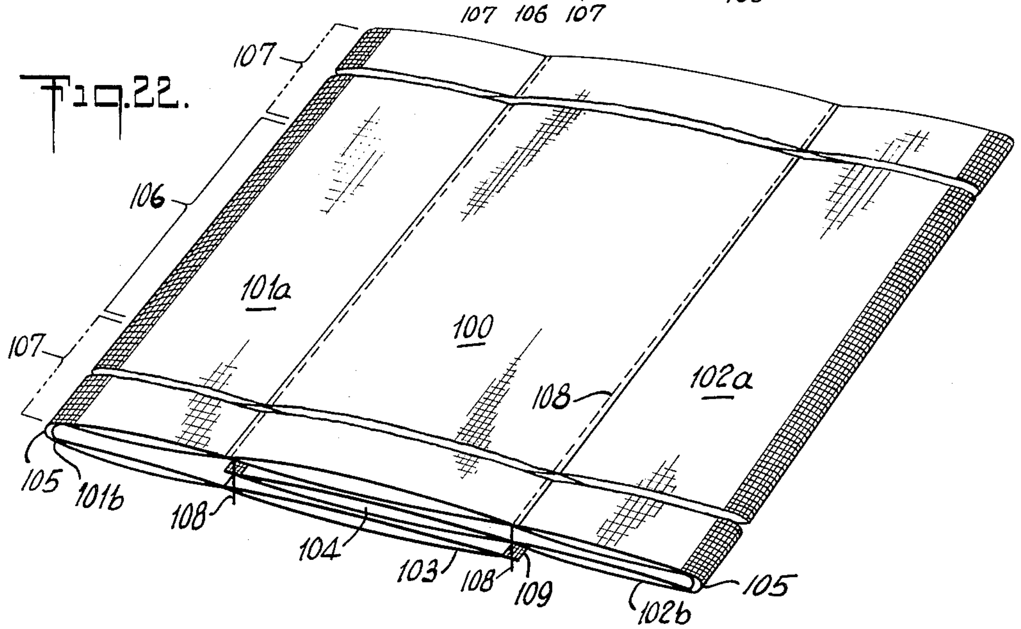
Figure 23:
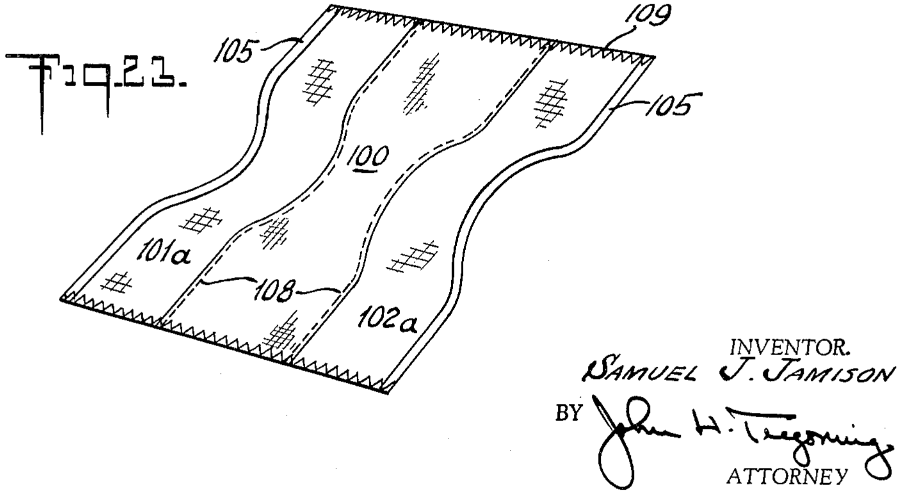

FIGS. 21 through 23 depict a diaper blank similar to that claimed in U.S. 3,072,124; however, it is shown with the advantages of the instant invention incorporated therein. FIG. 21 describes a diaper fabric having longitudinal selvages 109 and wearing strips 105. Extending in the warp direction, or in the longitudinal direction, are panels 100 through 104. Of these, panels 100, 103 and 104 are of multi-ply construction and have the same weave; which is a 2/1 twill. Panels 101*a*, and *b*, and 102*a*, and *b*, are also of multi-ply construction and each has a plain weave. The wearing strips 105 are of double-ply construction and have the same weave as panels 100, 103 and 104. Running or extending in the fill direction are zones 106 and 107. The detailed diaper blank in FIG. 21 and each blank taken from the diaper fabric has, in this instance, 30% of the total number of fill yarn in the diaper provided with a high twist multiplier of between 5 and 8 and all of these high twist fill yarns are located in zone 106. It is to be understood that zone 106 may also contain fill yarn with standard twist and this will depend to a large extent on the area of the zone 106 which in this instance is of an area equal to 40% of the total area of the diaper blank. The remaining yarn of both sets in the diaper blank have a standard twist multiplier. This means, of course, that all of the yarn in zones 107 have standard twist. Thus in accordance with this invention, the diaper blanks of the fabric of FIG. 21 are each provided with an activating zone 106.

The detailed diaper blank of FIG. 21 is adapted to be folded along wearing strips 105 as shown in fragmentary view in FIG. 22, and stitched 108 as shown, to secure it in position. After washing and drying the folded and secured diaper blank of FIG. 22, due to the excessive shrinkage evidenced in activating zone 106, takes the hourglass shape shown in FIG. 23 due to the positioning, by superimposition of the activating zones 106 of each panel to extend from one opposite edge of the diaper to the other across the centers of the panels. Of course, it is understood that one or two pairs of intermediate zones may be interposed in juxtaposed relationship to existing zones 106 and 107 and that any or all zones may be of different weaves. Additionally, as has been taught hereinbefore, the activating zone 106 can be positioned, for example, to extend in the fill direction from one selvage 109 to the other, and equally from one longitudinal edge of the diaper blank toward the center of the blank a distance sufficient to permit it to occupy an area equal to from 25% to 50% of the total area of the diaper. Folding as above, and shrinking would provide a T-shaped diaper in that instance. The activating zone could actually be positioned in any position which construction would permit and could, therefore, effect several preconceived contours in the diaper blank after shrinking.

The invention is illustrated by the following specific examples of suitable diapers. They are given primarily for the purposes of illustration, however, and should not be construed as limiting the invention to the details given.

*Example 1*

Diaper cloth with plain one over one weave is woven in two layers, 38 inches wide with single layer pinking bars 2 inches wide spaced along the warp direction at intervals of about 21 inches. The warp yarns (randomized S and Z twist) are 25's woven 40 ends to the inch and the filling yarns (all Z twist) 34.3's woven 38 picks to the inch. The warp yarns have a twist multiplier of about 4.75 which gives 23.8 turns per inch. The filling yarns in the pinking bar and for about 6 inches in the warp direction on both sides of each pinking bar have a twist multiplier of about 3.78 which gives 22.4 turns per inch while the filling yarns in the intermediate 6½ inches in the warp direction have a twist multiplier of about 7.00 which gives 41 turns per inch. Diapers made by cutting the above fabric midway along the pinking bars, overlapping the portions adjacent the selvage edges by folding in the manner previously described and as illustrated in FIG. 2B, sewing the folded blank adjacent the selvages to prevent unfolding will, upon washing and drying, be found to have shrunk about 14% more in the center ⅓ portion than the remaining portions. The diaper will have an hourglass shape and be form-fitting as shown in FIG. 5.

*Example 2*

Single layer diaper cloth with a "bird's-eye" weave is woven approximately 40 inches wide with plain weave pinking bars 2 inches wide spaced along the warp direction at intervals of about 15 inches. The warp yarns are 30's woven 66 ends to the inch and the filling yarns (all Z twist) are 16's woven 46 picks to the inch.. The filling yarns have a twist multiplier of about 3.5 which gives 14 turns per inch. The warp yarns in the selvage edges and for 4 inches in the filling direction adjacent both selvage edges have a twist multiplier of 4.75 which gives 25.8 turns per inch and are random S and Z twist yarns. Adjacent each of the above-described 4-inch zones there are 8-inch zones in the filling direction. 25% of the warp yarns in each 8-inch zone have a twist multiplier of 4.75 which gives 25.8 turns per inch while the remaining warp yarns in each 8-inch zone have a twist multiplier of 7.0 which gives 38.2 turns per inch. All of the warp yarns in the zone are Z twisted. The high and low twist yarns are randomly disposed throughout the 8-inch zone. The center 16 inches in the filling direction of the fabric have warp yarns with random S and Z twist having a twist multiplier of 4.75 which gives 25.8 turns per inch. Diapers made by cutting the above fabric midway along the pinking bars, superimposing the selvage edges as previously described and as illustrated in FIG. 10, sewing the folded blank adjacent the pinked edges, washing and drying, will be found to have shrunk about 16% more in the high shrinkage zone. This is the 8-inch zone parallel to the superimposed selvage edges with the center line of the zone 8 inches from the selvage edges. The diaper will have a form-fitting shape similar to that shown in FIG. 7.

*Example 3*

Diaper cloth with plain one over one weave is woven in two layers 38 inches wide with a single layer pinking bar two inches wide spaced along the warp direction at intervals of about 20 inches. The warp yarns (randomized S and Z twist) are 25's woven 39 ends to the inch and the filling yarns (all Z twist) are 35's woven 38 picks to the inch. The warp yarns have a twist multiplier of 4.75 which gives 23.8 turns per inch. The filling yarns in the pinking bar and for about 4 inches in the warp direction on both sides of each pinking bar have a twist multiplier of 3.50 which gives 20.7 turns per inch. Parallel to and adjacent the above-described 4-inch zone there is another 4-inch zone measured in the warp direction. The filling yarns in the second 4-inch zone have a twist multiplier of 5.3 which gives 31.4 turns per inch. Parallel to and between these second 4-inch zones and hence centered between pinking bars is another 4-inch zone of filling yarns extending in the warp direction. These filling yarns have a twist multiplier of 7.0 which gives 41.5 turns per inch. Diapers made by cutting the above fabric midway along the pinking bars, overlapping the portions adjacent the selvage edges by folding in the manner previously described and as illustrated in FIG. 4, sewing the folded blank adjacent the selvages to prevent unfolding in washing and drying, will be found to have shrunk 17% more in the center ⅕ of the diaper and about 10% more in each ⅕ of the diaper on both sides of the center ⅕ than in the remaining portions of the diaper adjacent the pinked edges. The diaper will have an hourglass shape and be form-fitting.

*Example 4*

Diaper cloth with a plain weave is woven in three layers 41 inches wide with a 2-inch wide single layer pinking bar spaced along the warp direction at intervals of about 12 inches. Running the length of the cloth and at the center of the cloth is a 1-inch wide tightly woven wearing strip.

The warp yarns are 25's, with 120 ends per inch in the three layers or 40 ends per inch in each layer. The warp yarns in the selvage edges and for 6½ inches in the filling direction adjacent both selvage edges have a twist multiplier of 4.2 and have a randomized S and Z direction of twist. Adjacent each of the above-described 6½ inch zones are other 6½ inch zones in the filling direction. The warp yarns in these zones have a twist multiplier of 7.0 and are all Z twist yarns. The center 14 inches of the cloth, including the 1-inch wearing strip, contain warp yarns having a twist multiplier of 4.2 and the yarns have a randomized S and Z twist. The filling yarns are 32.7's woven 94 picks per inch in the three layers or about 31.3 ends per inch in each layer. The filling yarns are all Z twisted and have a twist multiplier of 3.78. Diapers are made by cutting the above fabric midway along the pinking bar, folding about the wearing strip to superimpose the selvage edges as illustrated in FIG. 10 and sewing the folded blank adjacent the pinked edges. On washing and drying the diaper it is found to shrink about 30% more in the center 6½ inches (the high shrinkage zone), than in the other zones of the diaper. The diaper will have a form-fitting shape similar to that shown in FIG. 7.

*Example 5*

Diaper cloth with a plain weave is woven 41 inches wide with a reinforced wearing strip 1 inch wide running the length of the cloth and in the center of the cloth. The filling yarns are 32.7's, all Z twist yarns having a twist multiplier of 3.78. The warp yarns are 25's and are S and Z twisted yarns randomized over the width of the fabric. The warp yarns in the selvage edges and for 6½ inches in the filling direction adjacent both selvage edges have a twist multiplier of 4.2. Adjacent each of the above-described 6½ inch zones are other 6½ inch zones in the filling direction. The warp yarns in these zones have a twist multiplier of 7.0. The warp yarns in the center 14 inches of the cloth, including the 1-inch wearing strip, have a twist multiplier of 4.2.

In a 4-inch zone running the width of the cloth the cloth is woven in three layers with a yarn count of 40 x 31.3 in each layer. In the next 6 inches of the cloth it is woven in four layers with the top and bottom layers having a yarn count of 40 x 31.3 and each of the two middle layers having a yarn count of 20 x 15.6. The next 4 inches of the cloth is woven in a similar manner as the 4-inch zones previously mentioned. The zones, i.e. the 4-inch zone, 6-inch zone and 4-inch zone, are repeated for the length of the cloth. A diaper blank is made by cutting the cloth between adjacent 4-inch zones. The diaper is made by folding the blank about the wearing strip to superimpose selvage edges and then overedging the cut edges to prevent raveling. Upon washing and drying the diaper is found to shrink about 20% more in the center 6½ inch zone than in the other zones to form an hourglass shape.

*Example 6*

Diaper cloth with a plain one over one weave is woven in two layers, 38 inches wide. The warp yarns (randomized S and Z twist) are 25's woven 40 ends to the inch and filling yarns (all Z twist) 34.3's woven 38 picks to the inch. The fill yarn has a twist multiplier of 3.78 which gives 22.4 turns per inch. The warp yarns from one longitudinal edge of the diaper and extending equally 16 inches in the fill direction, i.e. toward the opposite longitudinal edge of the diaper cloth are provided with a twist multiplier of 7.00 which gives 41 turns per inch while the remaining warp yarn has a twist multiplier of 4.75 which gives 23.8 turns per inch. Selvage edges are provided.

Diapers made by cutting the above fabric from one longitudinal edge, or from one selvage edge, to the opposite one at 21 inch intervals provide diaper blanks having an activating zone running a little less than the length of the diaper which, after washing and drying, is found to shrink about 14% more than the remainder of the blank to provide a T-shaped diaper. Appropriately dividing into two and locating the activating zone, followed by folding to superimpose the two activating zones will result in a folded diaper which on shrinking will effect a T-shaped contour.

In practicing the present invention it is preferred that the fabric be woven initially with relatively wide spacing between individual yarns, i.e. that the fabric be defined as diaper fabric. Wide spacing of the yarns permits them to be pushed or squeezed together upon shrinkage. The spacing between yarns depends on both the size of the yarns and the number of warp and filling ends per inch.

In addition to a two-ply fabric, the present invention contemplates a diaper having a single-ply or a plurality of plies (greater than two), or a combination of a single-ply with two or more plies or several plies intermittently interwoven to provide a double cloth or a multi-layered single-ply.

In a single-ply fabric, the number of warp and filling ends per inch preferably would be greater than the number of warp and filling ends per inch in each ply of a two-ply fabric of equivalent weight. In a fabric having more than two plies, the number of warp and filling ends per inch in each ply may be less than the number of warp and filling ends per inch in each ply of a two-ply fabric.

The invention has been described in connection with its preferred embodiment but many modifications thereof are included within its spirit. It is to be limited, therefore, only by the scope of the appended claims.

What is claimed is:

1. A gauze diaper having at least one activating zone, said diaper having from about 25% to about 60% of the yarns of one set of yarn provided with a high twist multiplier of from about 5 to about 8, the remaining yarns having a normal twist multiplier, there being a twist multiplier difference of at least about 1.5 between said normal and said high twist yarns, said activating zones being characterized by containing all of said high twist yarn and said activating zone being capable of shrinking at least two inches more in the direction of said high twist yarn than is the remainder of said diaper, to provide a shaped zone in said diaper.

2. The diaper of claim 1 wherein said activating zone has a weave different than the rest of said diaper.

3. A gauze diaper having at least one activating zone, said diaper having from about 25% to about 60% of the yarns of one set of yarn provided with a high twist multiplier, wherein the remaining yarns have a normal twist multiplier, there being a twist multiplier difference of at least about 1.5 between said normal and said high twist yarns, and three substantially parallel zones defining said diaper, each of said zones extending from one lateral edge of said diaper to the other and each zone being substantially parallel to the longitudinal edge of said diaper, the intermediate of said zones being an activating zone and containing all of said high twist yarns, said activating zone being capable of shrinking at least two inches more in the direction of said high twist yarn than is the remainder of said diaper to provide a shaped zone in said diaper.

4. The diaper of claim 3 wherein a first pair of intermediate zones having a twist multiplier intermediate of said high and said normal twist yarn is interposed one parallel and contiguous to each side of said activating zone.

5. The diaper of claim 3 wherein a second pair of zones having a twist multiplier intermediate of both the yarns of said first pair of zones and said normal yarn is interposed each parallel and contiguous to one side of one of said first pair of zones and contiguous to the zone containing all normal twist yarn.

6. A diaper comprising a rectangular diaper fabric having from about 25% to about 60% of one set of yarn provided with a high twist multiplier of from about 5 to about 8, the remaining yarn having a normal twist multiplier, there being a twist multiplier difference of at least about 1.5 between said normal and said high twist yarns, and two substantially parallel zones defining said diaper, each of said zones extending the width of said diaper, one of said zones being an activating zone containing all of said high twist yarns and occupying from about 25% to about 50% of the total area of said diaper and said activating zone being capable of shrinking at least two inches more in the direction of said high twist yarn than is the remainder of said diaper to provide a shaped zone in said diaper.

7. The diaper of claim 6 wherein a third zone having a high twist multiplier intermediate said high twist yarn and said standard yarn is interposed between said first two parallel zones.

8. A diaper comprising a rectangular diaper fabric having from about 25% to about 60% of one set of yarn provided with a high twist multiplier of from about 5 to about 8, the remaining yarns of said diaper being of standard twist, there being a twist multiplier difference of at least 1.5 between said high twist and said standard twist yarns, a reinforcing strip extending from one longitudinal edge of said diaper to the other to divide said diaper into two substantially equal panels, each of said panels having an activating zone extending from one longitudinal edge of said diaper to the other whereby each of said activating zones is correspondingly positioned intermediate of said reinforcing strip and the widthwise edge of said diaper and whereby both of said activating zones occupy a combined area of from about 25% to about 50% of the total area of said diaper, said activating zones containing, in substantially equal amounts, all of said high twist yarns, said diaper being adapted to fold along said reinforcing strips to superimpose each of said activating zones and said activating zones being capable of shrinking at least two inches more in the direction of said high twist yarn than is the remainder of said diaper to provide a shaped zone in said diaper.

9. The diaper of claim 8 wherein a first pair of intermediate zones having a twist multiplier intermediate of said high twist and said normal twist yarn is interposed one parallel and contiguous to each side of said activating zones.

10. The diaper of claim 8 wherein said activating zone is constructed equidistant from the lateral edges of said diaper, and wherein a wearing strip is woven in said diaper and extends from one longitudinal edge of said diaper to the other to divide said activating zone into two substantially equal panels, said diaper being adapted to fold along said wearing strip to superimpose the two similar halves of said diaper and said diaper being adapted to shrink in said activating zone to provide a diaper of T-shaped configuration.

11. A diaper comprising a 2 ply rectangular diaper fabric having from about 25% to about 60% of one set of yarns provided with a high twist multiplier of from about 5 to about 8, and wherein the remaining yarns have a normal twist multiplier, there being a twist multiplier different of at least 1.5 between said normal and said high twist yarn and an activating zone positioned centrally substantially parallel to the longitudinal edge of said diaper and extending from one lateral edge of said diaper to the other, said zone occupying from about 25% to about 50% of the total area of said diaper and containing all of said high twist yarns, said rectangular diaper having its two opposing lateral edges folded over the same surface of the diaper in parallel relation to form opposed marginal panels of unequal breadth with a separating section of the sheet between the marginal panels, the diaper being folded to superimpose the marginal panels and the lateral edges of the sheet and the longer of said marginal panels being folded under again whereby an 8 ply rectangular panel section enveloped between the interior surface of the panel section is formed and said folded diaper is secured in position, and said activating zones being capable of shrinking at least two inches more in the direction of said high twist yarn than is the remainder of said diaper to provide a shaped zone in said diaper.

12. The diaper of claim 11 wherein said rectangular diaper has its two opposing lateral edges folded over the same surface of the sheet in parallel relation to superimpose one of said edges over the other to provide a 6 ply center section.

13. A diaper comprising a rectangular diaper fabric having from about 25% to about 60% of one set of yarn provided with a high twist multiplier of from about 5 to about 8, the remaining yarn of said diaper being of standard twist, there being a twist multiplier difference of at least 1.5 between said high twist and said standard twist yarn, a central panel positioned intermediate the length of said diaper and extending from one longitudinal edge of said diaper to the opposite longitudinal edge, a first and a second pair side parallel panels similarly positioned on either side of said central panel, said second pair of panels and said central panel being activating zones by containing, in substantially equal amounts, all of said high twist yarn, and a wearing strip dividing equally each of said first panels, said diaper being adapted to be folded along said wearing strips to superimpose said central and each of said second panels and secured in position, and said folded diaper being adapted to shrink in said activating zones, and said activating zones being capable of shrinking at least two inches more in the direction of said high twist yarn than is the remainder of said diaper to provide a shaped zone in said diaper.

14. A diaper comprising a rectangular diaper fabric having from about 25% to about 60% of one set of yarn provided with a high twist multiplier of from about 5 to about 8, the remaining yarn having a normal twist multiplier, there being a twist multiplier difference of at least 1.5 between said normal and said high twist yarn, and an activating zone containing all of said high twist yarn positioned intermediate the lateral edges of said diaper and extending from one longitudinal edge of said diaper to the other, and said activating zones being capable of shrinking at least two inches more in the direction of said high twist yarn than is the remainder of said diaper to provide a shaped zone in said diaper.

15. A diaper comprising a rectangular diaper fabric having from about 25% to about 60% of one set of yarn provided with a high twist multiplier of from about 5 to about 8, the remainig yarns of said diaper being of standard twist, there being a twist multiplier difference of at least 1.5 between said high twist and said normal twist yarns, said diaper being divided into two substantially equal panels, each of said panels having an activating zone etxending from one longitudinal edge of said diaper to the other, each of said activating zones being correspondingly positioned within each of said panels, and both of said activating zones occupy a combined area of from about 25% to about 50% of the total area of said diaper, said activating zones containing, in substantially equal amounts, all of said high twist yarns, said diaper being adapted to fold to superimpose said activating zones and said activating zones being capable of shrinking at least two inches more in the direction of said high twist yarn than is the remainder of said diaper, to provide a shaped zone in said diaper.

References Cited by the Examiner

UNITED STATES PATENTS

| | | | |
|---|---|---|---|
| 1,842,623 | 1/1932 | Moore | 139—385.5 |
| 1,842,729 | 1/1932 | Moore | 139—385.5 |
| 1,941,868 | 1/1934 | Leavy | 128—284 |
| 2,588,113 | 3/1952 | Harrison | 128—284 |
| 2,649,858 | 8/1953 | Le Bolt | 128—284 |
| 2,754,824 | 7/1956 | Blaufus | 128—284 |
| 2,833,282 | 5/1958 | Moore | 128—284 |
| 2,845,069 | 7/1958 | Jamison et al. | 139—383 |
| 2,995,154 | 7/1961 | Seltzer | 139—383 |

DONALD W. PARKER, *Primary Examiner*